INVENTOR.
Maynard S. Grunder
BY
Fred C. Matheny
ATTORNEY

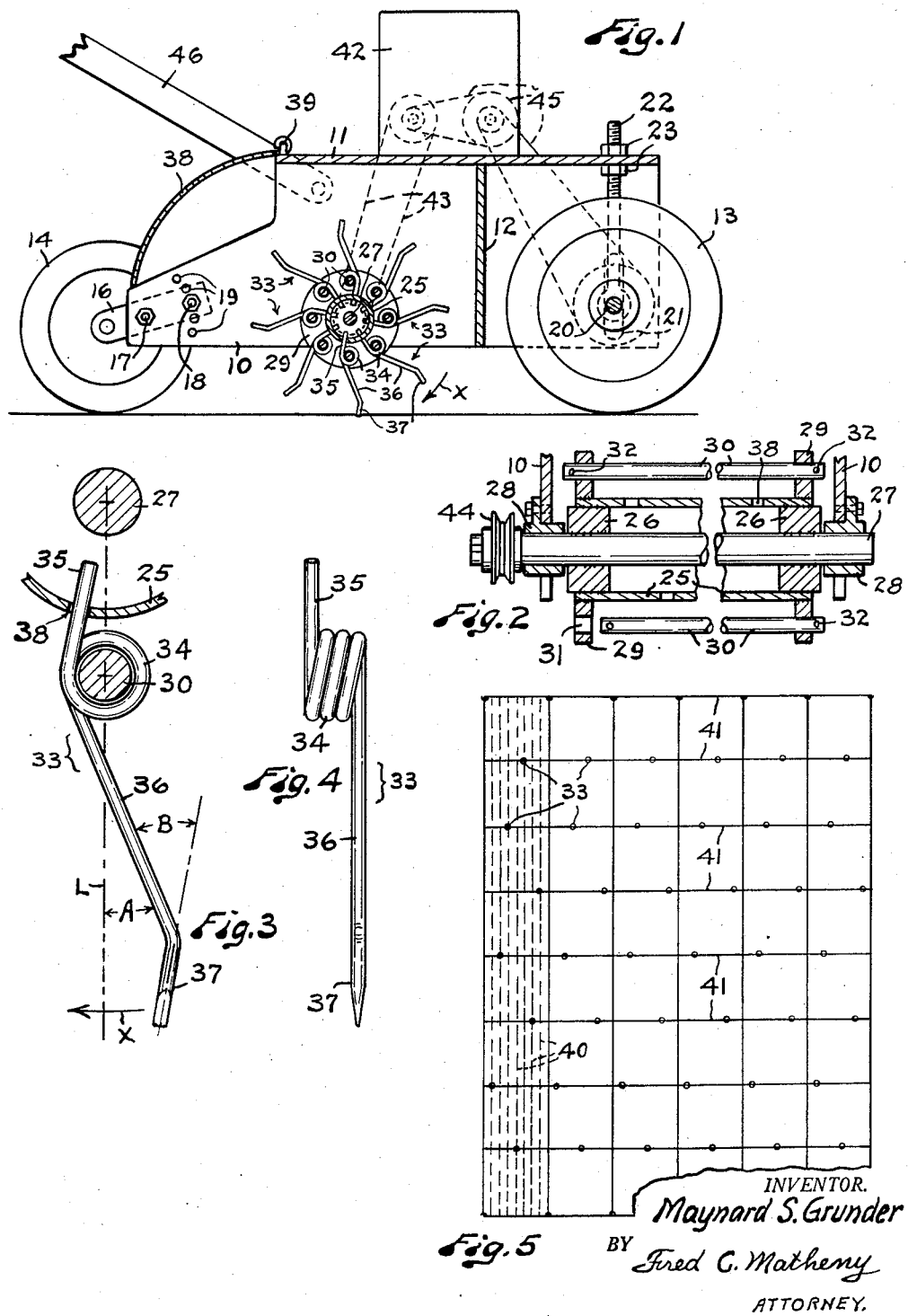

United States Patent Office 2,902,098
Patented Sept. 1, 1959

2,902,098

IMPLEMENT FOR RENOVATING, CONDITIONING AND CULTIVATING GROWING GRASS

Maynard S. Grunder, Puyallup, Wash.

Application June 28, 1956, Serial No. 594,579

1 Claim. (Cl. 172—96)

My invention relates to an implement for renovating, conditioning and cultivating growing grass and an object of my invention is to provide an implement of this nature which is particularly well adapted for use on lawns, pastures and like stands of growing grass.

Another object of my invention is to provide an implement of this nature having teeth which, in the operation of the device, move through the grass like the teeth of a comb but which are arranged and positioned so that each tooth is applied independently and individually to the grass and there is no tendency to pull out tufts or bunches of the gass or grass roots due to joint operation of adjacent teeth.

In certain crops, such as lawns, pastures, and others particularly of a grassy perennial nature, which are grown in solid stand or in solid rows, a mat of old dead material or prostrate living stems may develop, or undesirable growth such as moss may crowd the desired species. These conditions are detrimental to the health of the desired crop and may retard its development or smother it completely. On pastures the surface of the ground may become partially covered with mole hills and piles of animal droppings, which tend to smother the grass. My lawn and pasture renovator is designed to improve the health and vigor of the crops by dislodging old dead material, prostrate living material, moss and like growths and by spreading mole hills, droppings and the like.

This implement is not a rake because it does not operate to gather up loose material. Rakes are designed to gather up loose material and their teeth are arranged in close proximity so that a number of adjacent teeth work together conjointly to bunch or dislodge the material they engage. My grass renovator is designed so as to make each tooth work individually. This is accomplished by separating and dispersing the individual teeth as far as possible from each other within the limits afforded by the structure. The object accomplished by this dispersion is to make it possible for each tooth to sweep through the turf or grass to remove moss, dead grass, stolens and the like, to spread mole hills and droppings, to actually loosen and cultivate the soil surface under-sod, all without damaging the stand of the crop. Because each tooth sweeps through the sod individually it will not tear out clumps of sod as will be the case if two or more teeth in close proximity are applied to the same sod at the same time.

Another object of my invention is to provide a grass renovator in which the individual teeth are made with a substantial backsweep angle and in which the tips or turf engaging ends of said teeth are bent or inclined forwardly at an angle greater than the backsweep angle and are sharpened chisel shape so that the chisel shaped tip parts of the teeth pass edgewise through the turf. This backsweep of the teeth accomplishes three purposes, namely, it makes the implement substantially immune to clogging because, even in heavy work, the dislodged material is thrust sidewise by the backsweep of the teeth, the backsweep of the teeth protects them by increasing their ability to swing backward and sidewise and slide over and around hard objects encountered in the work, and the backsweep of the teeth gives them an easier and more gentle action as respects the turf to which they are applied. The forward bend of the ends of the teeth helps in the removal of moss, dead grass and the like also helps in cultivation of the soil.

Other objects of my invention will be apparent from the following description taken in connection with the accompanying drawings.

Figure 1 is a view partly in longitudinal vertical section and partly in elevation showing a lawn type grass renovator constructed in accordance with this invention.

Fig. 2 is a detached fragmentary sectional view, with parts in elevation, showing a rotary tooth carrying frame, the teeth being omitted.

Fig. 3 is a side view of one of the resilient teeth with fragments of the tooth carrying frame shown in cross section.

Fig. 4 is a front view of the tooth shown in Fig. 3 with the frame omitted.

Fig. 5 is a schematic development view illustrating one typical arrangement and positioning of the teeth which may be used in a rotor constructed in accordance with my invention.

Like reference numerals indicate like parts throughout the several views.

Figure 6:
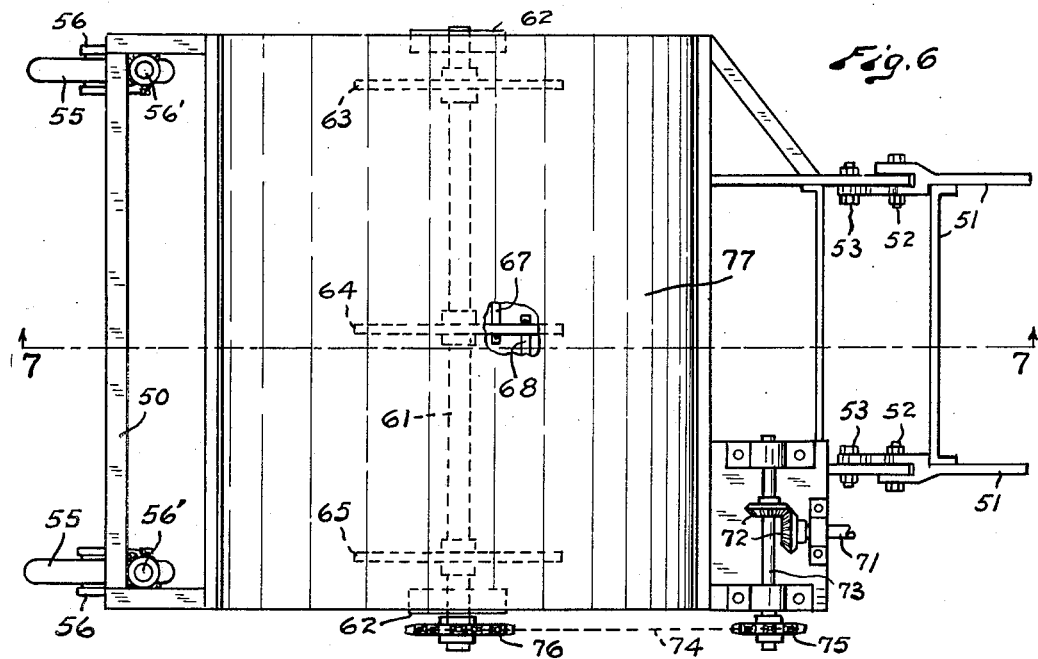
Fig. 6 is a top plan view showing a pasture type grass renovator constructed in accordance with my invention.

Referring to the power operated type grass renovator illustrated in Figs. 1 to 5, I show a frame comprising side walls 10, a top wall 11 and a vertical cross wall or partition 12, all of which are rigid relative to each other. This frame is generally of rectangular shape in plan and preferably is supported on two front wheels 13 and two rear wheels 14 positioned near the four corners of the frame. Only one front wheel 13 and one rear wheel 14 are herein shown. Preferably all of the wheels 13 and 14 are vertically adjustable relative to the frame. One satisfactory way to provide for adjustment of the rear wheels 14 is to mount each rear wheel on a lever arm 16 which is fulcrumed on a pivot 17 and adjustably connected with the frame wall 10 by a bolt 18 inserted in any selected one of a plurality of holes 19. Adjustment of the front wheels 13 can be provided by mounting each front wheel on a transverse axle 20 which is guided in vertical slots 21 in the frame sides 10 and supporting each end portion of the axle 20 by a bolt 22 which extends upwardly through the top wall 11 of the frame and is adjustably mounted in said top wall 11 by nuts 23.

The rotor disclosed in Figs. 1 to 5 comprises an axial tube 25 rigidly mounted by sleeves 26 or like means on an axle 27. The axle 27 protrudes from the respective ends of the tube 25 and the protruding ends of said axle are journaled in suitable bearings 28 in the side members 10 of the frame. Two discs 29 are rigidly attached to the respective end portions of the tube 25. A plurality of equally spaced apart rods 30 are disposed parallel to each other and parallel to the shaft 27 and tube 25 and spaced outwardly from the tube 25. These rods 30 extend through holes 31 in the discs 29 and preferably are releasably held in place by pins 32, making them easy to remove.

Resilient teeth, designated generally by the numeral 33, are carried by the rods 30 and positioned and held by the tube 25. Each tooth 33 comprises a coil 34, a short shank 35 extending in one general direction away from the coil, a main tooth portion 36 extending in an approximately opposite direction away from the coil, and a tip 37 extending at an incline or angle from the outer end of the main tooth portion 36. The end of each tip 37 is sharpened to a chisel point by flattening the lateral faces of the same so that the narrower dimension of the chisel point will lie in the path of movement of the tooth as it moves through the grass. The coil 24 of each tooth fits over one of the rods 30 and the shank 35 of each tooth extends into a perforation 38 in the tube 25. The teeth are thus held accurately in position and at the same time are held loosely enough so they can deflect sidewise if they encounter solid obstructions. The tube 25 functions as a tooth shank anchor member and the discs 29 function as rod supports.

Each main tooth portion 36, outwardly considered, has a substantial backsweep or rearward incline in the direction of its movement from a radial line L, Fig. 3, common to the center of the rotor and the center of the coil 34 of said tooth, as indicated by the angle A. The tip portion 37 of each tooth has a forward incline, preferably of about thirty degrees relative to the main tooth part 36, as indicated by angle B. The backsweep of the main tooth part 36 helps to prevent clogging or loading and the forward incline of the tip portions 37 gives them a slight pitch relative to the ground surface where they contact the same. This increases their ground penetrating and cultivating action and make them more efficient in removing moss, dead grass and the like.

The teeth 33 are positioned and arranged in the rotor so that each tooth will work independently in the grass. This is accomplished by spacing teeth which are aligned longitudinally of the rotor far enough apart so that each tooth acts on the grass independently of the teeth alongside of it and so that no two teeth pass through the same tuft or bunch of grass at the same time. Fig. 5 is a development showing diagrammatically in a flat view a typical tooth arrangement for a cylindrical rotor of the form shown in Figs. 1 to 4. In this figure horizontal dimensions represent longitudinal dimensions or length on the rotor and vertical dimensions on the figure represent circumferential distances on the rotor. The teeth 33 are indicated by circles. These teeth 33 are positioned in closely adjacent paths circumferentially of the rotor, as indicated by vertical broken lines 40 but the teeth in the paths 40 close to each other are offset far enough around the rotor so that they will move through the grass one after another with no two teeth in closely adjacent paths working simultaneously in one tuft or bunch of grass. All teeth 33 which are in near enough alignment longitudinally of the rotor so that they will contact the ground at the same time, such as the teeth on the horizontal lines 41, are spaced apart far enough so they are not working in the same bunches or tufts of grass at the same time and the action of each tooth is totally independent of the others. Obviously the arrangement of the teeth 33 will vary in different rotors and may be varied substantially from the pattern shown in Fig. 5 and still provide a dispersed tooth arrangement in which individual application of each tooth to the grass is obtained. The rotor is driven in the direction indicated by the arrows X in Figs. 1 and 3 by conventional power operated driving means indicated diagrammatically as a motor 42 connected by a belt 43 with a pulley 44 on the rotor shaft 27. Obviously the driving member 43 can be a sprocket chain and the pulley 44 can be a sprocket wheel. The machine can be guided by handles 46 and can be propelled manually. Preferably however, power operated driving means 45 of conventional form is provided between the motor 42 and front wheels 13. Preferably the driven speed of the tips 37 of the rotor teeth is several times the ground speed of the machine.

Figure 7:
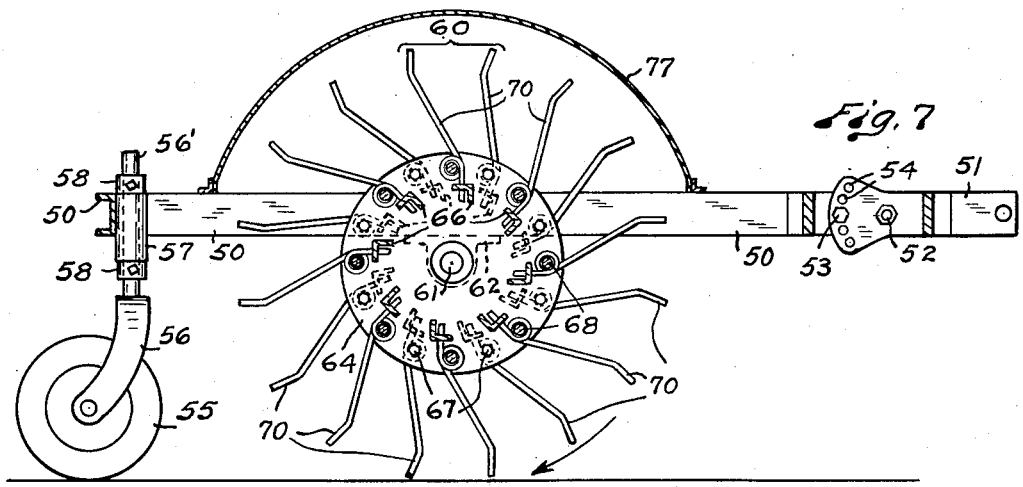
Fig. 7 is a view partly in vertical section and partly in elevation taken substantially on broken line 7—7 of Fig. 6.

Figs. 6 and 7 show a pasture type grass conditioner comprising a frame 50 having at its forward end tractor hitch means 51 whereby the machine may be drawn. Preferably the tractor hitch means 51 provides for vertical adjustment of the front end portion of the frame 50. One way to do this is to connect each side of the hitch 51 with the frame 50 by a pivot bolt 52 and another bolt 53, the bolt 53 being adjustable into different holes 54 in the tractor hitch 51 to provide this vertical adjustment. Two caster wheels 55 mounted in forks 56 having stems 56' carry the rear end of frame 50. The stems 56' are adjustably supported in bearing tubes 57 by set collars 58 which provide vertical adjustment.

A rotor 60, similar to the rotor shown in Figs. 1 to 4 but larger in size is mounted transversely of the frame 50 about mid way between the two ends thereof. The rotor 60 comprises a shaft 61 journaled in bearings 62 and carrying a tooth supporting cage or frame made up of three spaced apart discs 63, 64, and 65, a plurality of angle bars 66 serving as tooth shank anchor means and extending between and rigidly secured to said discs, and two sets of rods 67 and 68 removably carried by the discs 63, 64 and 65. The rods 67 and 68 are all positioned in a circular path and the rods of one set are preferably angularly offset about mid way between the rods of the other set. The angle bars 66 are similarly offset. This distributes weight and load more evenly and improves the balance of large rotors and makes it easier to change teeth than it would be if each rod extended entirely across the rotor. An angle bar 66 is positioned inwardly from each rod 67 and 68 and is perforated at proper intervals to receive the shanks of teeth 70. The teeth 70 are similar to the hereinbefore described teeth 33 except that they are larger and stronger. The spring loops of the teeth 70 fit over the rods 66 and 67. The positioning and dispersal of the teeth 70 in each half of the rotor is similar to the positioning and dispersal of teeth 33 so that each tooth 70 operates individually and independently of the other teeth in passing through the grass.

The rotor 60 is driven in the direction indicated by the arrow in Fig. 7, preferably by suitable power take-off means. This may comprise a driven power take-off shaft 71 connected by bevel gears 72 with a jack shaft 73 and a sprocket chain 74 operating on one sprocket wheel 75 on the jack shaft 73 and another sprocket wheel 76 on the rotor shaft 61. Preferably a guard member 77 covers the rotor 60.

The operation of the pasture type grass renovator shown in Figs. 6 and 7 is substantially the same as the operation of the lawn type renovator shown in Figs. 1 to 5 and hereinbefore described.

The foregoing description and accompanying drawings clearly illustrate preferred embodiments of this invention but it will be understood that changes may be made within the scope of the following claim.

I claim:

In a machine for renovating, conditioning and cultivating growing grass, a wheel supported movable frame; a driven rotor shaft rotatively supported horizontally of said frame; driving means connected with said shaft rotating said shaft in the same direction as the wheels of the machine when the machine is in operation; perforated tooth-shank anchor means rigid with said rotor shaft and spaced outwardly therefrom; spaced apart rod supports rigid with said rotor shaft and extending outwardly beyond said tooth-shank anchor means; spaced apart rods disposed parallel to said shaft and carried by said rod supports and positioned in a cylindrical path around said tooth-shank anchor means outwardly therefrom; and a plurality of one piece unitary resilient teeth each comprising a resilient coil pivotally mounted on one of said rods, a shank extending inwardly from said coil and anchored in a perforation in said tooth-shank anchor means, a main body portion extending outwardly from said coil at a substantial backsweep angle from a radial line common to the axis of the rotor shaft and the center of the coil of the tooth, and a substantially straight tip portion on the outer end of said body portion, each tip portion being substantially straight and being inclined forwardly relative to the main body portion at an angle greater than the backsweep angle of said main body portion, said rotor shaft and rods and rod supports and teeth forming a rotor, said teeth being aligned in rows, each row being transverse to the longitudinal axis of the machine, each tooth being in a vertical plane which plane is parallel to the longitudinal axis of the machine and no two teeth being in the same vertical plane, the tip portions of the teeth when in the lower part of their paths of travel moving in a direction opposite to the direction of travel of the machine and providing independent and individual application of each tooth to the grass when the rotor is rotated.

References Cited in the file of this patent

UNITED STATES PATENTS

| | | |
|---|---|---|
| 934,238 | Tripp | Sept. 14, 1909 |
| 2,214,702 | Seaman | Sept. 10, 1940 |
| 2,229,497 | Dontje | Jan. 21, 1941 |
| 2,595,537 | Pitcher | May 6, 1952 |

FOREIGN PATENTS

| | | |
|---|---|---|
| 516,810 | Germany | Jan. 28, 1931 |
| 26,593 | Great Britain | of 1912 |